United States Patent
Winkler

[15] 3,699,860
[45] Oct. 24, 1972

[54] PHOTOGRAPHIC APPARATUS WITH IMPELLER-OPERATED SOURCE OF ARTIFICIAL LIGHT

[72] Inventor: Alfred Winkler, Munich, Germany

[73] Assignee: Agfa-Gevaert Aktiengesellschaft, Leverkusen, Germany

[22] Filed: May 24, 1971

[21] Appl. No.: 146,290

[30] Foreign Application Priority Data

May 23, 1970 Germany..........P 20 25 181.4

[52] U.S. Cl. .................95/11.5 R, 95/11 L, 240/1.3
[51] Int. Cl. ............................................G03b 15/04
[58] Field of Search ......95/11.5 R, 11 L; 431/92, 93; 240/1.3

[56] References Cited

UNITED STATES PATENTS 2,972,937  2/1961  Suits..........................95/11.5
590,204    9/1897  Blackmore .................95/11.5

Primary Examiner—Robert P. Greiner
Attorney—Michael S. Striker

[57] ABSTRACT

A still camera wherein the release element stresses a spring during a first stage of its movement from the starting position and disengages a blocking lever from a pivotable impeller during the second stage of its movement whereby the spring propels a pin of the impeller against a cartridge which fires a flash lamp or against a piezoelectric block which produces a high-voltage pulse for the firing of an electronic flash unit. At the same time, the impeller opens the shutter so that the subject or scene is illuminated by artificial light while the shutter is open. A second spring urges the release element back to its starting position. During such return movement, the release element returns the blocking lever into engagement with the impeller. The extent to which the release element moves during stressing of the spring which bears against the impeller is adjustable.

12 Claims, 4 Drawing Figures

PATENTED OCT 24 1972
3,699,860
Fig.1
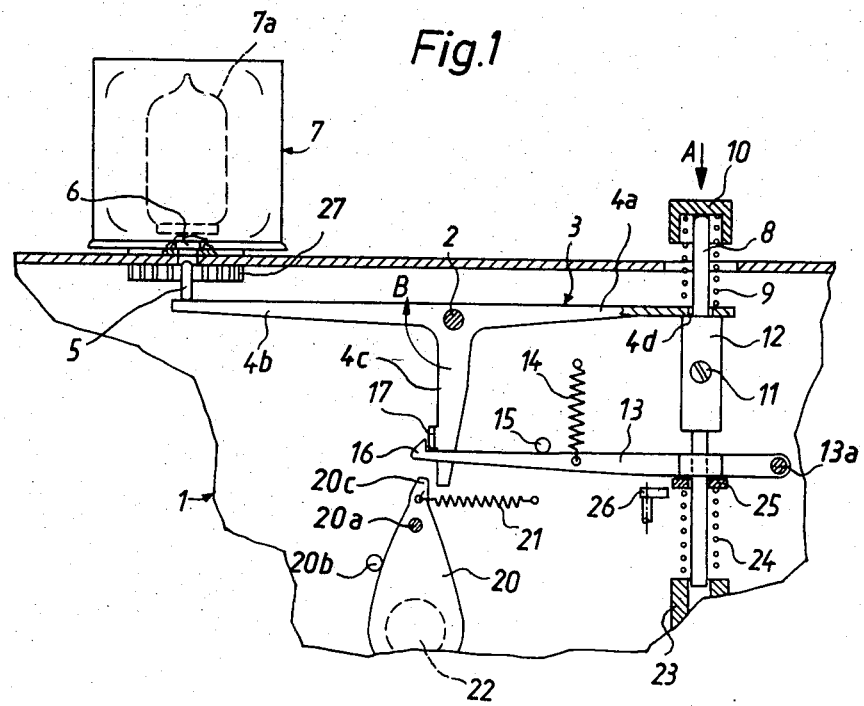
Fig.2
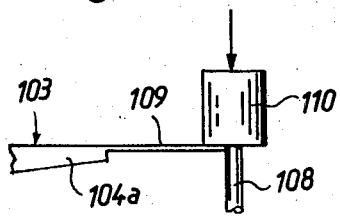
Fig.3
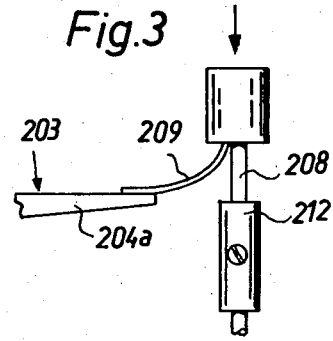
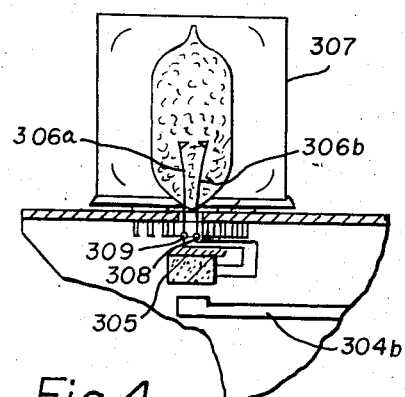
Fig.4
INVENTOR
ALFRED WINKLER
BY
Attorney

PHOTOGRAPHIC APPARATUS WITH IMPELLER-OPERATED SOURCE OF ARTIFICIAL LIGHT

BACKGROUND OF THE INVENTION

The present invention relates to photographic apparatus in general, and more particularly to improvements in photographic apparatus which are designed to make exposures with or without artificial illumination of a scene or subject. Still more particularly, the invention relates to improvements in mechanisms for actuating a source of artificial illumination in synchronism with opening of the shutter.

SUMMARY OF THE INVENTION

An object of the invention is to provide a photographic apparatus, especially a still camera, with a simple, reliable, compact and rugged mechanism which can actuate a source of artificial illumination at the exact moment when the shutter admits scene light against an unexposed film frame.

Another object of the invention is to provide a mechanism of the just outlined character which comprises a small number of simple parts and can actuate several types of artificial light sources, such as flashcube or an electronic flash unit.

A further object of the invention is to provide a novel and improved connection between the release element of a photographic apparatus which is provided with a built-in or detachable source of artificial illumination and the actuating mechanism for such source.

An additional object of the invention is to provide a still camera wherein the mechanism which actuates the light source automatically reassumes its operative position when the release element is returned or permitted to return to its starting position.

The photographic apparatus of the present invention comprises a housing or body, release means which is movable with reference to the housing to and from a starting position, an impeller having a motion receiving portion and an actuating portion and being movable in the housing between a cocked and an uncocked position, movable blocking or arresting means located in the path of movement of the release means and having retaining means for releasably holding the impeller in the cocked position, biasing means interposed between the release means and the motion receiving portion to store energy during the first stage of movement of the release means from its starting position, disengaging means for disconnecting the retaining means from the impeller upon completion of the first stage of movement of the release means from its starting position so that the biasing means can propel the impeller toward the uncocked position, and a source of artificial light mounted in or on the housing and having a portion (e.g., a cartridge for the firing of a flash lamp or a piezoelectric block for the generation of high-voltage pulses which are necessary to fire an electronic flash unit) located in the path of movement of the actuating portion during movement of the impeller from its cocked position. The impeller can also actuate the shutter so that the latter opens when the source of artificial light illuminates a subject of scene.

The novel features which are considered as characteristic for the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary vertical sectional view of a still camera which embodies a mechanism for actuating a flashcube and which is constructed and assembled in accordance with a first embodiment of the invention;

FIG. 2 illustrates the impeller of a modified mechanism;

FIG. 3 illustrates a release element which constitutes a modification of the release element shown in FIG. 1; and FIG. 4 is a fragmentary vertical sectional view of a modified camera.

DESCRIPTION OF THE PREFERRED EMBODIMENTS

FIG. 1 illustrates a portion of a still camera having a housing or body 1 which accommodates a substantially T-shaped impeller 3 having a first or motion receiving portion or arm 4a, a second or actuating portion or arm 4b and a third portion or arm 4c. The impeller 3 is pivotable in the housing 1 about the axis of a fixed pivot pin 2 and is normally held in the illustrated cocked or first position by the retaining projection or pallet 16 of a pivotable blocking lever 13. The arm 4c has a projection or lug 17 which is normally engaged by the pallet 16. The free end of the actuating arm 4b carries an extension 5 which constitutes a firing pin and serves to strike against a cartridge 6 in an indexible source 7 of artificial light here shown as a flashcube with four equidistant lamps 7a. The flashcube 7 has a cartridge 6 for each of the four lamps 7a and each cartridge first the respective lamp when is it struck by the firing pin 5 in response to movement of the impeller from the illustrated cocked position to an uncocked position. During such movement, the impeller 3 turns in a clockwise direction as indicated by the arrow B.

The camera further comprises a reciprocable release element 8 which is shown in its starting or retracted position and is depressible by hand to move in the direction indicated by the arrow A and to assume an operative position. The movement of the release element 8 from its starting to its operative position is a two-stage movement; during the first stage of such movement, the release element causes a helical spring 9 to store energy, and during the second stage of such movement, an adjustable disengaging sleeve 12 on the release element disconnects the pallet 16 of the blocking lever 13 from the projection 17 of the arm 4c so that the spring 9 can propel the impeller 4 to its uncocked position with a force which suffices to cause the firing pin 5 to strike the adjacent cartridge with a force which is needed to fire the respective flash lamp 7a. The stem or shank of the release element 8 is movable with some clearance through an opening 4d in the motion receiving arm 4a of the impeller 3. The release element 8 has readily accessible knob or retainer 10 against which the spring 9 reacts. The other end convolution of the spring 9 bears against the motion receiving arm 4a. When the release element 8 is held in the illustrated starting position, the upper end face of the disengaging sleeve 12 may serve as an abutment for the arm 4a; this sleeve is adjustably secured to the shank of the release element 8 by a radial screw 11 or a similar fastener.

The blocking lever 13 is pivotable on a fixedly mounted pilot pin 13a and is biased in a clockwise direction, as viewed in FIG. 1, by a helical spring 14 which normally maintains it in abutment with a stationary stop post 15. When the blocking lever 13 abuts against the post 15 and the impeller 3 dwells in the illustrated cocked position, the retaining pallet 16 engages the projection 17 of the arm 4c. The arm 4c serves as a means for opening a shutter here shown as including a single shutter blade 20 which is pivotable in the housing 1 about a fixed pivot pin 20a and is biased by a return spring 21 which maintains it in abutment with a stationary stop 20b. In such position, the shutter blade 20 overlaps a light-admitting aperture 22 which registers with the foremost unexposed film frame, not shown. The upwardly projecting extension 20c of the shutter blade 20 is located in the path of movement of the arm 4c so that the shutter blade is automatically pivoted to its open position in response to movement of the impeller 3 from its cocked position. The spring 21 stores energy during movement of the blade 20 to its open position and automatically returns the blade to the illustrated closed position upon completion of an exposure.

The simple shutter of FIG 1 can be replaced with a more sophisticated shutter, e.g., with a shutter having two or more blades.

The lower end portion of the shank of the release element 8 is reciprocably guided in a stationary bearing 23 of the housing 1. A helical spring 24 reacts against the upper end face of the bearing 23 and bears against a collar 25 on the release element 8 so that the latter stresses the spring 24 during movement from its starting position and is thereupon automatically returned to such starting position by the spring 24 when the finger pressure upon the knob 10 is terminated. The collar 25 is adjacent to a pivotable double exposure preventing member 26 which is movable between the illustrated idle position and a second position in which it extends into the path of movement of the colar 25 to thus prevent depression of the release element 8. The member 26 is moved to its idle position by the film transporting mechanism, not shown, and is moved to its operative or arresting position in response to return movement of the release element 8 to its starting position. Thus, the member 25 prevents repeated depression of the release element 8 and thus prevents double exposure of film frames. In other words, the film transporting mechanism must have been actuated to transport the film by the length of the frame between two successive movements of the release element 8 from its starting position. The operative connection between the double exposure preventing member 26 and the release element 8 (or a component which receives motion from the release element) may include a gear train, a linkage or any other suitable means which insures that the member 25 assumes its arresting position in automatic response to return movement of the release element 8 to its starting position.

The operation:

When the camera is ready to make an exposure with artificial illumination of a subject or scene, the parts of the camera assume the positions which are shown in FIG. 1. If the user wishes to make an exposure, the knob 10 is depressed in the direction indicated by the arrow A whereby the shank of the release element 8 moves the disengaging sleeve 12 downwardly and the knob 10 causes the spring 9 to store energy. During the first stage of movement of the release element 8 from its starting position, the impeller 3 remains in the illustrated cocked position because the pallet 16 of the blocking lever 13 holds the projection 17 on the arm 4c and thus prevents rotation of the impeller in a clockwise direction. The spring 9 bears against the motion receiving arm 4a with a continuously increasing force and the lower end face of the sleeve 12 engages and pivots the blocking lever in a counterclockwise direction, as viewed in the drawing, when the spring 9 has stored sufficient energy to propel the impeller in the direction indicated by the arrow B with a force which suffices to cause the firing of a lamp 7a in response to abrupt impact of the firing pin 5 against the adjacent cartridge 6.

The counterclockwise pivotal movement of the blocking lever 13 takes place against the opposition of the spring 14. The spring 24 stores energy during movement of the release element 8 towards its operative position.

When the retaining pallet 16 of the blocking lever 13 releases the projection 17, the arm 4c starts to move in a clockwise direction and strikes against the extension 20c of the shutter blade 20 so that the latter is propelled to its open position and the aperture 22 admits light against an unexposed film frame at the exact moment when the firing pin 5 causes the adjacent cartridge 6 to fire the respective lamp 7a. Thus, the subject or scene is illuminated by artificial light which is furnished by such lamp 7a at the exact moment when the shutter is open.

When the finger pressure upon the knob 10 is terminated, the spring 24 starts to dissipate energy and moves the release element 8 back toward the illustrated starting position. The sleeve 12 pivots the motion receiving arm 4a in a counterclockwise direction and the spring 14 pivots the blocking lever 13 in a clockwise direction back into abutment with the stop 15 whereby the retaining pallet 16 reengages the projection 17 of the arm 4c. Thus, the impeller 3 is held in its cocked position. The shutter blade 20 is already located in the illustrated closed position because it returns to such position after a fixed interval of time which is determined by the bias of the spring 21. The camera can be provided with suitable adjusting means to change the bias of the spring 21 and hence the duration of exposure time.

The fastener 11 enables a repairman to adjust the position of the sleeve 12 in the axial direction of the shank of the release element 8. Such adjustment results in adjustment of the bias of spring 9 at the exact moment (termination of the first stage of movement of the release element 8 to its operative position) when the sleeve 12 disconnects the retaining pallet 16 from the projection 17 to thus free the impeller 3 for movement to its uncocked position. In other words, the sleeve 12 is adjustable to change the extent of the first stage of movement of the release element 8 from its starting position and to thus change the amount of energy which is stored by the spring 9 when the impeller 3 is free to leave the cocked position.

The double exposure preventing member 26 automatically pivots or otherwise moves into the path of the collar 25 on the release element 8 when the latter reassumes the illustrated starting position. This means that the user cannot depress the knob 10 prior to actuation of the film transporting mechanism, i.e., prior to transport of the film by the length of a frame. In this way, the member 26 insures that each film frame can be exposed only once.

The manner in which the flashcube 7 is indexible in response to actuation of the film transporting mechanism or in response to the return movement of release element 8 to its starting position forms no part of the present invention. The drawing shows a gear 27 which is driven by or forms part of the film transporting mechanism and is assumed to turn the flashcube 7 through 90° or through a whole multiple of 90° when the film transporting mechanism is actuated to advance the film by the length of a frame.

It is clear that the improved camera is susceptible of many additional modifications. For example, the flashcube 7 can be replaced by an electronic flash unit or by another source of artificial illumination. The pin 5 or an otherwise configurated portion of the actuating arm 4b can strike against a piezoelectric block to generate a high-voltage pulse which is used to fire an electronic flash unit in response to movement of the impeller to its uncocked position.

This modification is shown in FIG. 4 wherein the flashcube is illustrated at 307 and a piezoelectric block at 305. A flash unit including four lamps each having two electrodes 306a, 306b provided with terminals 308, 309 is installed in the casing of the flashcube 307. The terminals 308, 309 of that lamp which faces the subject are circuit with the block 305. When the actuating portion 304b of the impeller strikes against the block 305, the latter generates a high-voltage pulse which fires the respective lamp.

FIG. 2 shows the motion receiving arm 104a of a modified impeller 100. The arm is provided with an integral leaf spring 109 which replaces the helical spring 9 of FIG. 1 and stores energy in response to depression of the knob 110 of a reciprocable release element 108.

FIG. 3 illustrates a release element 208 having an integral spring 209 which bears against the motion receiving arm 204a of an impeller 203 and is free to propel the impeller to the uncocked position when the disengaging sleeve 212 of the release element 208 disconnects the retaining portion of a blocking member (not shown) from the impeller upon completion of the first stage of movement of the release element 208 to its operative position.

Without further analysis, the foregoing will so fully reveal the gist of the present invention that others can by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is set forth in the appended claims:

1. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position; disengaging means rigid with said release means and arranged to disconnect said retaining means from said impeller so that the latter is propelled to said uncocked position under the action of said biasing means upon completion of said first stage of movement of said release means; and a source of artificial light supported by said housing, said source including at least one lamp and an impact receiving portion located in the path of movement of said actuating portion during movement of said impeller to said uncocked position and arranged to fire said lamp in response to reception of an impact from said actuating portion.

2. The combination as defined in claim 1, further comprising second biasing means for urging said release means to said starting position.

3. The combination as defined in claim 1, wherein said release means is reciprocable between said positions thereof and said motion receiving portion is provided with an opening for said release means, said release means comprising a retainer spaced from said opening and said biasing means comprising a spring reacting against said retainer and bearing against said motion receiving portion so as to store energy in response to movement of said retainer in a direction toward said opening.

4. The combination as defined in claim 1, wherein said source comprises a lamp and a cartridge which fires said lamp in response to impact by said actuating portion.

5. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position, said biasing means including a leaf spring which is integral with said impeller; disengaging means for disconnecting said retaining means from said impeller so that the latter is propelled to said uncocked position under the action of said biasing means upon completion of said first stage of movement of said release means; and a source of artificial light supported by said housing, said source including at least one lamp and an impact receiving portion located in the path of movement of said actuating portion during movement of said impeller to said uncocked position and arranged to fire said lamp in response to reception of an impact from said actuating portion.

6. In a photographic apparatus, the combination of a housing; release means movable with reference to said housing between starting and operative positions, the movement of said release means including a first stage and a second stage; and impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position, said biasing means being integral with said release means; disengaging means for disconnecting said retaining means from said impeller so that the latter is propelled to said uncocked position under the action of said biasing means upon completion of said first stage of movement of said release means; and a source of artificial light supported by said housing, said source including at least one lamp and an impact receiving portion located in the path of movement of said actuating portion during movement of said impeller to said uncocked position and arranged to fire said lamp in response to reception of an impact from said actuating portion.

7. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said. impeller in said cocked position; biasing means interposed between said release means and said motion receiving portion to store energy during said first stage of movement of said release means from said starting position; disengaging means for disconnecting said retaining means from said impeller so that the latter is propelled to said uncocked position under the action of said biasing means upon completion of said first stage of movement of said release means said disengaging means being adjustable with reference to said release means to thereby change the extent of said first stage of movement of said release means from said starting position and the extent to which said biasing means is stressed during said first stage; and a source of aritificial light supported by said housing, said source including at least one lamp and an impact receiving portion located in the path of movement of said actuating portion during movement of said impeller to said uncocked position and arranged to fire said lamp in response to reception of an impact from said actuating portion.

8. The combination as defined in claim 7, wherein said release means is reciprocable between said positions thereof and said disengaging means is adjustable lengthwise of said release means.

9. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position; disengaging means for disconnecting said retaining means from said impeller so that the latter is propelled to said uncocked position under the action of said biasing means upon completion of said first stage of movement of said release means; a source of artificial light supported by said housing, said source including at least one lamp and an impact receiving portion located in the path of movement of said actuating portion during movement of said impeller to said uncocked position and arranged to fire said lamp in response to reception of an impact from said actuating position; and shutter means movable between open and closed positions and normally assuming said closed position, said shutter means having a portion extending into the path of movement of said impeller to said uncocked position so that the impeller effects the opening of said shutter means by way of said portion of said shutter means during movement from said cocked to said uncocked position thereof.

10. The combination as defined in claim 9, wherein said impeller comprises a third portion which is held by said retaining means in the cocked position of said impeller and strikes against said portion of said shutter means during movement of said impeller to said uncocked position.

11. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position; disengaging means for disconnecting said retaining means from said impeller so that the latter is propelled to said uncocked position under the action of said biasing means upon completion of said first stage of movement of said release means, and a source of artificial light supported by said housing, said source including a flash unit and an impact receiving portion including a piezoelectric element located in the path of movement of said actuating portion during movement of said impeller to said uncocked position, said piezoelectric element being arranged to produce a high-voltage pulse and to thereby fire said unit in response to reception of an impact from said actuating portion.

12. In a photographic apparatus, the combination of a housing; release means movable with reference to said housing between starting and operative positions, the movement of said release means including a first stage and a second stage; an impeller having a motion receiving portion and an actuating portion and being movable in said housing between cocked and uncocked positions; movable blocking means located in the path of movement of said release means and having retaining means for releasably holding said impeller in said cocked position; biasing means interposed between said release means and said motion receiving portion to store energy during said first stage of movement of said release means from said starting position; disengaging means for disconnecting said retaining means from said impeller so that the latter is propelled to said uncocked position under the action of said biasing means upon completion of said first stage of movement of said release means; a source of artificial light supported by said housing, said source including at least one lamp and an impact receiving portion located in the path of movement of said actuating portion during movement of said impeller to said uncocked position and arranged to fire said lamp in response to reception of an impact from said actuating portion; and double exposure preventing means movable into and from the path of movement of said release means from said starting position.

* * * * *